United States Patent [19]

Subramanyam et al.

[11] 4,376,848

[45] Mar. 15, 1983

[54] WATER DILUTABLE CATHODIC DEPOSITABLE RESINOUS BINDER PRODUCTION AND USE

[75] Inventors: Arty R. T. Subramanyam, Wuppertal; Manfred Schröder, Herdecke, both of Fed. Rep. of Germany

[73] Assignee: Lackwerke Wulfing GmbH & Co., Wuppertal, Fed. Rep. of Germany

[21] Appl. No.: 250,639

[22] Filed: Apr. 3, 1981

[30] Foreign Application Priority Data

Apr. 15, 1980 [DE] Fed. Rep. of Germany ....... 3014890

[51] Int. Cl.$^3$ ...................... C08L 74/04; C08G 71/04
[52] U.S. Cl. ............................... 525/452; 204/181 C; 523/404; 523/414; 524/901; 525/454; 525/461; 525/481; 525/510; 525/526; 525/529; 525/530; 525/532
[58] Field of Search ................ 260/29.2 EP, 29.6 NR; 204/181 C; 525/529, 530, 526, 452, 532; 524/901

[56] References Cited

U.S. PATENT DOCUMENTS

| | | | |
|---|---|---|---|
| 2,795,572 | 6/1957 | Mueller et al. | 260/77.5 |
| 3,414,634 | 12/1968 | Sorkin | 260/837 |
| 4,033,917 | 7/1977 | Sermakas et al. | 260/29.2 N |
| 4,036,800 | 7/1977 | Sekmakas et al. | 260/29.2 TN |
| 4,093,594 | 6/1978 | Anderson | 260/47 EP |
| 4,116,900 | 9/1978 | Belanger | 260/18 EP |
| 4,134,864 | 1/1979 | Belanger | 260/18 EP |
| 4,137,140 | 1/1979 | Belanger | 204/181 C |
| 4,139,510 | 2/1979 | Anderson | 260/29.2 EP |
| 4,248,753 | 2/1981 | Buckwalter et al. | 260/29.2 EP |
| 4,297,261 | 10/1981 | Jozwiak, Jr. | 260/29.2 EP |

FOREIGN PATENT DOCUMENTS

| | | |
|---|---|---|
| 862888 | 1/1953 | Fed. Rep. of Germany . |
| 1546840 | 2/1971 | Fed. Rep. of Germany . |
| 2002756 | 7/1971 | Fed. Rep. of Germany . |
| 2003123 | 7/1971 | Fed. Rep. of Germany . |
| 2252536 | 8/1973 | Fed. Rep. of Germany . |
| 2620612 | 12/1976 | Fed. Rep. of Germany . |
| 2541801 | 3/1977 | Fed. Rep. of Germany . |
| 2707482 | 1/1978 | Fed. Rep. of Germany . |

OTHER PUBLICATIONS

A. M. Paquin, Springer Verlag; Epoxiverbindungen Undepoxidharze, 1958, pp. 342-345, 352, 353, 358, 359.
Schenck et al., "Process In Organic Coatings", (1979), pp. 1-77, The Chemistry of Binders for Electrodeposition.

*Primary Examiner*—Theodore E. Pertilla
*Attorney, Agent, or Firm*—Merriam, Marshall & Bicknell

[57] ABSTRACT

The invention provides nitrogen-containing basic binders having tertiary amino groups. They are produced from compounds or resins having at least one secondary amino group through reaction with a compound which contains both an epoxy group and an olefinic double bond, followed by copolymerization of the reaction product with a polymerizable monomer having an ethylenic double bond. The binders have amine numbers of about 40 to 400. They can be diluted with water after partial neutralization by acid. They are electrically depositable on the cathode and can be heat hardened alone or in combination with amino resins and/or phenolic resins. They can be used as internal and/or external cross-linking components in cathodic electrocoating paints.

18 Claims, No Drawings

WATER DILUTABLE CATHODIC DEPOSITABLE RESINOUS BINDER PRODUCTION AND USE

This invention concerns a nitrogen-containing basic binder of film-forming base which, after partial neutralization with an acid, is water dilutable, electrically depositable on a cathode and which can be thermally hardened alone or in combination with an amino resin and/or a phenolic resin, a process for the manufacture of the binder as well as its use.

The electrophoretic deposition of synthetic resins and other synthetic materials, also designated as electrocoating, has been known for a long time. While anodic electrocoating (See, for example, Fritz Beck, Principal Laboratory of the BASF AG, Ludwigshafen, in "Process in Organic Coatings,", 4, 1-60 (1976), has been used nearly exclusively in the last few years for commercial purposes, recently so-called cathodic electrocoating has increasingly gained in significance. A series of binders appropriate for this use are known from the literature (See, for example H. U. Schenck, H. Spoor and M. Marx, Synthetic Material Laboratory of the BASF AG, Ludwigshafen, in "Process in Organic Coatings", 7, 1-77 (1979), in particular pp. 57-66). These known binders have groups that are neutralizable by means of acids and after partial to complete neutralization they can be diluted with water. They are deposited from water solution as basic insoluble precipitates under the action of direct electric current on metallic work pieces being cathodically positioned, electrically conductive or rendered conductive.

An advantage of cathodic electrocoating, in comparison with anodic electrocoating, can be explained, on the one hand, from the deposition process itself and, on the other hand, from the chemical nature of the corresponding binder. Thus, for example, the corrosion protection properties, as well as the chemical stability of the binder, is significantly improved by means of the cathodic electrocating method. Also, the release of metal ions from the metallic work pieces that occurs in anodic electrocoating is eliminated by use of cathodic electrocoating. This avoids the disadvantageous effects which result from having the corresponding metal ions in the coating such as, for example, discoloration and stain formation in white and bright colored depositions as well as in solution or binder flowing disorders and a reduction in the stability characteristics of the coating.

Nitrogen-containing basic binders, used until now in cathodic depositable electrocoating paints, have been described frequently in the patent literature. In order to produce a suitable nitrogen-containing basic binder a series of distinct procedures has been used. Thus, compounds and/or resins having epoxy groups are reacted with secondary amines to produce resins or oligomers, having tertiary amino groups. Their many modifications, as with boric acid esters or with partially capped isocyanates, are described, for example, in the German OS Nos. 20 03 123 and 22 52 536.

Another modification is described, for example, in the German AS No. 15 46 840 and the German OS No. 20 02 756. They describe the copolymerization of various monomers with monomers having tertiary amino groups such as, for example, acrylic or methacrylic acid esters of N-tertiary amino alcohols, acrylic or methacrylic acid amides of primary or N-tertiary diamines or with glycidyl(meth)acrylate, and the subsequent reaction of the glycidyl epoxy groups of the copolymer with secondary amines.

A further procedure is described in German OS No. 25 41 801, namely, the reaction of Mannich-base condensed phenols with epoxy resins.

U.S. Pat. Nos. 4,033,917 and 4,036,800, as well as German OS No. 26 20 612, describe additional manufacturing variations in which, starting from glycidyl epoxy resins, prepolymers are produced through the addition of an unsaturated primary amine or an unsaturated urethane-monoisocyanate, whose subsequent copolymerization with monomers from the class of acrylic and methacrylic acid esters and acid amides leads to the desired binder. The last mentioned monomers contain tertiary amino groups whose neutralization with acids provides the entire copolymerizate with an ability to be diluted with water.

In spite of the previously stated advantages in using cathodic electrocoating, the presently known binder-paint systems present substantial deficiencies. Some of these deficiencies will be described.

The degree of neutralization, in most instances with acetic acid and/or lactic acid, that is required to attain a satisfactory ability to be diluted with water, in most cases between 50 and 100% based on the tertiary amino groups of the binder, produces paints having pH values below 6. This results in unstable paints, particularly with binders containing amino resins and/or phenolic resins. Furthermore, corrosion has been a considerable but unavoidable problem, both in the paint phase as well as in the vapour phase, in spite of the comparatively low 25° C. to 30° C. working temperatures.

After deposition of the previously known cathodic electrocoating paints or binders identified above, they have substantially high weight losses as a result of thermal hardening in the required temperature range of 180° C. to 200° C. The weight losses amount to about 20±5% by weight based on the desolvated and pregelled coatings at 105° C.

A further serious disadvantage of the previously used cathodic depositable binder-paint systems, namely the poor gravel stability of three or four layer coats compared to the common anodic electrocoating paints, has been known for a long time in the automobile industry. The poor mechanical properties can, in essence, be traced back to the cathodic deposited paint films and their above-mentioned behavior during hardening.

The nitrogen-containing basic binders, as described in U.S. Pat. Nos. 4,033,917 and 4,036,800, as well as in German OS No. 26 20 612, have distinct deficiencies of which only a few will be mentioned.

Water solubility or dispersability in water, can only be obtained with the nitrogen-containing basic acrylic monomers in the final copolymerization step by having mercaptan chain breakers present simultaneously. These in turn cause unpleasant odor problems, not only for the paint manufacturer, but also for the end user. Furthermore, the required degree of neutralization with organic acids, based on the amine number of the copolymerized resin, is in the range of at least 60 to 90%, so that in most instances the pH of the aqueous dispersions is significantly below 6. The disadvantages which result from this, in particular in combination of the copolymerized resin with amino resins and/or phenolic resins, have been mentioned above and have been known for a long time.

A primary purpose of the present invention is to eliminate many, if not all, of the above-mentioned disadvantages associated with the previously known cathodic depositable binders and to make available a nitrogen-containing basic binder which possesses an improved ability to dilute with water with a simultaneously significantly lower degree of neutralization being required compared to the previously known binders. Furthermore, the cathodic deposited and thermally hardened coatings derived from aqueous paints containing the binders should be superior in their overall properties compared to those previously known.

According to the invention, the above described problems and disadvantages are largely eliminated by a method provided herewith for the production of water dilutable, cathodic depositable and heat hardenable nitrogen-containing basic binders containing tertiary amino groups. This method is inventively characterized by the fact that compounds or resins having at least one secondary amino group are reacted with at least one compound having both one epoxy group and one copolymerizable olefinic double bond, and the reaction product is subsequently copolymerized with at least one polymerizable monomer having an ethylenic double bond.

The tertiary amino group which, in accordance with the invention, is required in the nitrogen-containing basic binder for salt formation and the ability to be diluted with water, in a preferred embodiment of the method of the invention, can be present in the starting resin or compound. However, the tertiary amino group can be incorporated, in a suitable proportion, in a subsequent step of the copolymerization using monomers having tertiary amino groups.

Particularly appropriate compounds or resins, for use in the method of the invention, are preferably obtained by reacting compounds and resins that contain one or more epoxy groups with a saturated primary amine.

Particularly suitable saturated primary amines which can be used are those with tertiary amino groups which, upon reaction with the compound or resin having one or more epoxy groups, yield the desired compounds.

A preferred compound having an epoxy group and a copolymerizable olefinic double bond is allylglycidylether.

The binder provided by the invention can be induced to cure or cross-link internally or externally by including a suitable monomer in the copolymerization step.

The aqueous paints formulated from a binder in accordance with the invention, and cathodic deposited, thermal hardened coatings formed from the paints, are characterized by having very good mechanical properties and remarkable chemical, water and alkali stability and corrosion resistance.

Coating materials provided by the invention, in comparison with the prior art, have several additional advantages. Thus, for example, by means of an appropriate formulation and the selection of components or starting compounds that have tertiary amino-groups, the binders can be controlled, with regards to their basicity, molecular weight distribution, polarity and in relationship to their reactive groups, in such a manner that even with only partial neutralization by means of acids one can obtain a binder having a pH in a range of about 6 to 7.5, having good dilutability with water and a cathodic despositability on an electric conductible substrate. In this way, the problem of bath stability is avoided as well as possible corrosion of the depositing and stoving installation through an acid concentration, for example acetic acid, which is too high. Furthermore, the binders, provided by the invention, yield films obtained from their aqueous paints through cathodic deposition and thermal hardening, that have a lower weight loss than many of the previously known cathodic electrocoating paints.

In the preferred embodiment of the invention, one starts with compounds or resins having epoxy groups. Particularly useful are the glycidyl ethers of phenols, for example 2,2-bis(4-hydroxyphenyl)propane (bisphenol A) as well as the glycidyl ether of bisphenol F or of the Novolak type, as well as the glycidyl ethers of aliphatic or cycloaliphatic mono alcohols, diols and polyols. Furthermore, the glycidyl esters of aliphatic, cycloaliphatic and /or aromatic mono- and di-basic carboxylic acids can also be used. Aliphatic alcohols and carboxylic acids particularly useful are those with carbon chain lengths from $C_4$ to $C_{14}$.

In the case of epoxy resins based on bisphenol A, bisphenol F, and their mixtures, those preferably used have epoxy equivalents in a range of about 150 to 4000, preferably in a range of about 200 to 1000.

Also suitably used, and which are within the scope of the invention, are epoxy compounds or epoxy resins which contain glycidyl urethane groups. They can be obtained by reaction of glycidol or 2-methylglycidol with an appropriate low or high molecular weight mono or polyisocyanate. The manufacture of such glycidyl urethanes has been known for a long time, and for example, is further described in German patent 862,888. Taking into account their molecular size and epoxy functionality, they can be used either alone or in combination with other epoxy compounds or epoxy resins.

Also useful in the invention are epoxy compounds or resins of the so-called glycidyl carbonate type as described, for example, in U.S. Pat. No. 2,795,572.

Further possibilities of modification by the starting epoxy compounds or resins, within the scope of the invention, are polyglycidyl ether of heterocyclic hydroxy containing compounds as, for example, those derived from isocyanuric acid.

Also particularly useful as modifying components are epoxy compounds and resins which promote corrosion protection including, among others, those derived from aniline, alkylanilines, or the reaction product of 4,4'-diaminodiphenylmethane with epichlorhydrin having the formula:

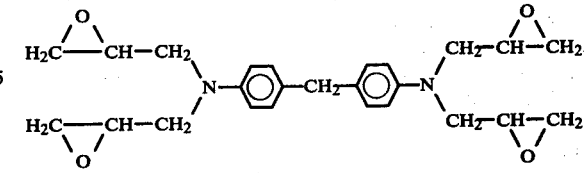

Furthermore epoxidized 1,3-diene liquid polymerizates (homo- as well as copolymerizates) may be used partly as epoxy group-containing prepolymers. These are preferably derived from butadiene polymerizates which have an average molecular weight ($\bar{M}\omega$) between 500 and 4000 and in which at least 20% of all the double bonds that are present are vinyl(1,2) double bonds as shown by the following formula:

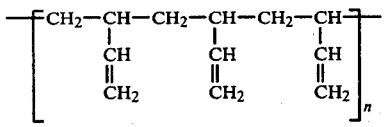

Furthermore, epoxidizing products from alkenes, alkadienes, cycloalkenes, cycloalkyldienes as well as vinylcycloalkenes and vinylcycloalkanes can also find application for part of the epoxy compound content.

In order to obtain the above-mentioned base resin or base compound containing secondary amino groups by using the above-identified epoxy group-containing compounds or resins, primary amines are employed which may be of aliphatic, cycloaliphatic, aromatic or heterocyclic nature. Preferably used are aliphatic amines or diamines which simultaneously contain a primary amino group and a tertiary amino group. In this connection, one can mention the following examples: dimethylaminopropylamine, diethylaminopropylamine, dimethylaminoethylamine, diethylaminoethylamine, diethylaminobutylamine, diethylamino-4-aminopentane as well as N-methyl-(3-aminopropyl)-ethanolamine.

In a preferred embodiment of the method, the appropriate amine or amine mixture is charged and heated to a temperature of more than 100° C. By a dropwise addition of the epoxy compound or resin or the mixture of such compounds and/or resins, the reaction is carried out until the reaction mixture has a zero epoxy value. In that way there is obtained the corresponding base resin or base compound having at least one secondary amino group.

The ratio of the primary amino groups, provided by the amine compound, to the epoxy groups should be $\geq 0.6:1$. When an excess of amine is used and the ratio is above 1:1, the nonreacted, excess amine can be removed by subsequent vacuum distillation.

In the next step of the method of the invention, one or more mono-olefinic mono-epoxy compound is reacted with the free reactive secondary amino groups of the above-mentioned base resin or base compound.

Representative of the mono-olefinic mono-epoxy compounds which can be used are, for example, those mentioned in the book by A. M. Paquin, Epoxiverbindungen and Epoxidharze (Epoxy compounds and epoxy resins), Springer Verlag, 1958, pp. 342–345, 352/353 and 358/359, the disclosure of which is incorporated herein by reference.

The addition reaction is preferably effected at an elevated temperature, desirably above 100° C., at which the monoolefinic mono-epoxy compound is added dropwise to the base resin or compound that has been pre-heated to the appropriate reaction temperature. For this reaction, about 0.05 to 1 mol, in particular 0.1 to 1 mol, preferably 0.2 to 0.5 mol of the mono-olefinic mono-epoxy compound is used for each secondary amino equivalents present. High viscosity or solid starting products can be added in partial dissolved, diluted form. A presently preferred monoolefinic mono-epoxy compound which can be used is allylglycidyl-ether.

In place of allylglycidylether there may be used the glycidylether of methallyl-, ethylallyl- and chlorallyl alcohol, as well as of 1-butene-3-ol, 1-pentene-3-ol, 1-hexene-3-ol, 3-methyl-1-butene-3-ol and 3-methyl-1-pentene-3-ol. Furthermore, the alpha-, beta- and gamma-methylglycidylallylethers, as well as the mixed $\alpha$-glycidyl-$\omega$-allyl-diether compounds, can be used. They are obtained, for example, by the reaction of low molecular weight diglycidyl compounds or oligomers based on bisphenol A or F, with allyl alcohol in the presence of boron trifluoride.

In place of allylglycidylether, vinylglycidylether can also be used. The manufacture of vinylglycidylethers, for example through ether formation from glycidol or 2-methylglycidol, has been described in U.S. Pat. No. 3,414,634.

Furthermore, the allylesters of epoxidized alkenyl carboxylic acids and monocyclo- or dicycloalkenyl carboxylic acids respectively, are also appropriate mono-epoxy mono-olefinic compounds useful in this invention.

Also suitable mono-epoxy mono-olefinic compounds are the allylglycidylcarbonates as, for example, those described in U.S. Pat. No. 2,795,572.

The subsequent copolymerization of the reaction product from the first step (the reaction of the secondary amine compound or resin with the mono-epoxy mono-olefinic containing compound) with a polymerizable ethylenic monomer of the general formula

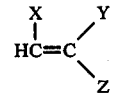

in which X represents hydrogen, a lower alkyl such as methyl, a di-lower alkyl amino group such as dimethylamino, phenyl, or a lower alkyl substituted phenyl such as tolyl, Y represents hydrogen, nitrile, —COOR wherein R is a $C_1$ to $C_6$ alkyl, especially methyl or ethyl, a $C_2$ to $C_6$ hydroxyalkyl such as hydroxyethyl, a $C_2$ to $C_4$ hydroxyalkyl lower dialkylamino such as hydroxymethyl dimethylamino,

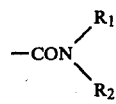

wherein $R_1$ is hydrogen, a $C_1$ to $C_4$ alkyl, —CH$_2$OH, or —CH$_2$OR$_3$ wherein $R_3$ is lower alkyl such as methyl, $R_2$ is hydrogen, a $C_1$ to $C_4$ alkyl or an N,N-dialkylaminoalkyl in which the alkyls are $C_1$ to $C_6$, such as dimethylaminoethyl and Z represents hydrogen or a lower alkyl and especially methyl, but X, Y and Z are not each hydrogen at the same time, is carried out under an inert gas in the presence of free radical catalysts or initiators at an elevated temperature above 100° C. The catalysts employed in this reaction are those commonly used in solution polymerization.

This copolymerization is desirably effected by dropwise addition of the monomer, preferably mixed with the optimal catalyst system. The reaction is then permitted to go to completion. Preferably used as the monomers are, for example:

1. Alkyl esters of acrylic and/or methacrylic acids as, for example, the $C_1$ to $C_8$ alkylesters such as, in particular, the ethyl, n-propyl, i-propyl, n-butyl, i-butyl, t-butyl and 2-ethylhexyl esters of acrylic acid and the methyl ester of methacrylic acid. Some (alkyl) vinylbenzenes (i.e. vinylbenzene and/or at least one alkylvinylbenzene) which are particularly useful are styrene as well as the ortho, meta and para alkylstyrenes with an alpha-$C_1$ to $C_3$ alkyl substituent.

2. Other co-monomers which are particularly appropriate are mono-hydroxy-$C_2$ to $C_6$-alkyl esters of (meth)acrylic acid (i.e. the acrylic and/or methacrylic acids) such as the 2-hydroxymethyl ester, the 2-hydroxy-propyl ester and the 4-hydroxybutyl ester as well, for example, as the vinyl esters from $C_1$ to $C_{12}$ aliphatic carboxylic acids and the nitriles of (meth)acrylic acid (i.e. the acrylic and/or methacrylic acids).

3. Aminoalkyl esters of the (meth)acrylic acids (i.e. the acrylic and/or methacrylic acids) are appropriate as, for example, the amino-$C_1$–$C_6$-alkyl esters such as the aminomethyl, aminopropyl and aminohexyl esters. Particularly suitable are the symmetric and the asymmetric mono-(N,N-di-$C_1$–$C_6$-alkylamino)-$C_1$–$C_6$-alkyl esters such as the mono-(N,N-dimethylamino)ethyl ester, the mono-(N,N-dibutylamino)ethyl ester and the mono-(N,N-dimethylamino)hexyl ester.

4. Amides, alkylamides, oxyalkylamides and oxaalkylamides of the (meth)-acrylic acids (i.e. the acrylic and/or methacrylic acids) are also useful, as for example acrylic and methacrylic acid amides; $C_1$–$C_6$-alkylamides such as methylamide and butylamide; oxyalkylamides as, for example, oxymethylamide; oxaalkylamides, in particular, the 2-oxaalkylamides with 2 to 5 carbon atoms in the oxaalkyl moiety such as the 2-oxapropyl and 2-oxahexylamides. Particularly satisfactory is the 2-oxaethylamide. Furthermore, monomers mentioned in German OS No. 27 07 482 can be used.

The ratio of the individual monomers to each other, the concentration of the catalysts, as well as the overall ratio of the mixture of monomers to each olefinic pre-product, is selected in such a manner that there is created a non-gelling, homogeneous, dissolved copolymerizate with an amine number in the range of 40 to 400 which, after partial neutralization with acetic acid, can be diluted with water and after which the pH value of the 10% aqueous dilution is in the range of about 5 to 8, preferably in a range of about 6 to 7.

When the olefinic pre-product is designated by A, and the monomeric mixture is designated by B, then the ratio of both components to each other will be selected to be in the following percentage parts by weight, namely:

A=95 to 5 parts by weight, preferably 80 to 20 parts by weight, and b=5 to 95 parts by weight, preferably 20 to 80 parts by weight.

The copolymerizate binders provided in accordance with the invention may be formulated for being cross-linked internally or externally depending on the starting and base products used. As a result, it is additionally possible to provide an electrically deposited film in non-hardened, but particularly in a thermally hardened form, which have a broad spectrum of technically useful properties.

In a preferred form for use as cathodic depositable, heat or thermal hardening electrocoating paints, the copolymerizate is used in combination with heat hardening amino resins and/or phenolic resins. In this regard, it is particularly advantageous to use reactive amino resins and/or phenolic resins in which none or only some of the methylol groups have been converted to ether groups.

For the purpose of improving compatibility between the copolymerizate in accordance with the invention and amino resins and/or phenolic resins, the mixture is pre-condensed at an elevated temperature above 60° C. In this way, above all, the ability of the mixture to be diluted with water is improved. It also insures obtaining a deposition equivalent to the mixing ratio of the copolymerizate, provided by the invention, to the amino resin and/or phenolic resin on a work piece positioned as cathode.

The copolymerizate resin provided by the invention and the amino resin and/or phenolic resin should be mixed together in a ratio selected in such a manner that the following weight ratios, taken on the basis of solid resin parts, are present:

Copolymerizate . . . 40 to 95 parts by weight, preferably 40 to 65 parts by weight.

Amino resin and/or phenolic resin . . . 60 to 5 parts by weight, preferably 60 to 35 parts by weight.

The stoving temperatures suitable for thermal hardening of the copolymerizate provided by the invention, in combination with an amino resin and/or phenolic resin, or in an internal cross-linking formulation, in the form of a deposited and dried film is about 150° C. to 200° C. in about 10 to 60 minutes.

The binder provided by the invention can be converted into a water-diluted form with an organic and/or inorganic acid. Preferably used are low molecular weight organic acids as, for example, formic acid, acetic acid and lactic acid.

The binder in accordance with the invention can be used for cathodic depositable electrocoating paints in an unpigmented form as well as in a pigmented form. The concentration of the copolymerizate resin or appropriate resin mixture or precondensate in the aqueous electrocoating paint preferably amounts to 5 to 20 percent by weight. They are deposited from their electrocoating paints at voltages within the range of about 50 to 500 volts, preferably within a range of 100 to 400 volts.

The invention is further illustrated by the following examples.

EXAMPLE I

Production of a Copolymerizable Adduct Resin With Allylglycidylether

In a four-necked flask equipped with a stirrer, thermometer, reflux condenser and drop funnel is heated 224 g (2.2 mol) of dimethyl-aminopropylamine under an inert gas (nitrogen) at 130° C. 1400 grams of a 75% xylol solution of an epoxy resin with an epoxy equivalent of 525 (product DER 671 of Dow Chemical) is added dropwise while stirring within a period of between 2 to 3 hours. The reaction mixture is kept at 130° C. until an epoxy value of zero is obtained. Subsequently, the excess amine and xylol is distilled off under a vacuum whereupon 52 grams (0.4 mol) of allylglycidylether is added dropwise within half an hour at 140° C. The mixture is reacted while stirring for another hour at 150° C. whereupon the adduct resin is adjusted with ethylene glycol ethyl ether to a solids content of 70 percent by weight.

EXAMPLE II

Production of Different Copolymerizates from Allylglycidylether-adduct-resin I

II-1

572 grams of a 70% adduct resin I (from Example I) is heated in a four-necked flask at 130° C. under an inert gas (nitrogen). With only stirring, a mixture made up of 80 grams of ethylhexylacrylate and 20 grams of hydroxypropylmethacrylate as well as 2 grams of di-tertiarybutyl peroxide is added dropwise within a 2 hour period and the mixture is kept at 130° C. while stirring for another 3 hours.

A copolymerizate resin is obtained with a solids content of about 74%. The viscosity of a 50% solution in ethylene glycol ethyl ether at 20° C. amounts to 1360 mm$^2$/s. The amine number of the solid resin is 120.

After partial neutralization (25% of the amine number) with 10% acetic acid, the resin has unlimited dilutability with water and in a 10% aqueous solution it has a pH value of 6.5. After the resin is placed in a cell for electrocoating, a deposition is obtained at 150 V on a steel sheet connected as cathode which, however, cannot be heat hardened up to 180° C. and which is easily dissolved by means of solvents.

II-2

The procedure of Example II-1 is followed except, however, the monomeric mixture is composed of 80 grams of ethylhexylacrylate, 10 grams of hydroxypropylmethacrylate and 10 grams of N,N-dimethylaminoethylmethacrylate.

The 74% copolymerizate resin possesses a viscosity (50% in ethylene glycol ethyl ether) of 1450 mm$^2$/s and has an amine number of 135.

A 10% aqueous solution of the resin neutralized to 25% of the amine number with acetic acid has a pH of 6.7.

A cathodic coating of the resin on a steel sheet is, similar to Example II-1, not heat or thermally hardenable.

II-3

The procedure of Example II-1 is followed except, however, the monomeric mixture uses 20 grams of styrol and 80 grams of ethylhexylacrylate. The copolymerizate resin has the following parameters:

Solids content 74%; viscosity (at 50%) 1550 mm$^2$/s; amine number 122.

A cathodic coating of the resin deposited from aqueous solution is, after heating in circulating air in an oven, somewhat harder than the coatings in Examples II-1 and II-2 but, however, it still can be easily dissolved off.

II-4

The procedure of Example II-1 is followed except, however, 676 grams of the 70% adduct resin I is diluted further with 324 grams of ethylene glycol ethyl ether and copolymerized with 600 grams of ethylhexylacrylate, 200 grams of hydroxypropylmethacrylate and 200 grams of styrol.

The copolymerizate has a solids content of 75%, a viscosity (50% in ethylene glycol ethyl ether) of 1240 mm$^2$/s and an amine number of 50.

A 10% aqueous solution of the resin neutralized to 30% of the amine number by means of acetic acid has a pH of 5.8.

Cathodic coatings of this resin on steel plate are just like those of Example II-1 to II-3 and still somewhat soft after heat hardening. They can be dissolved off easily by means of acetone and xylol.

II-5

572 grams of a 70% adduct resin I is heated in a four-necked flask under an inert gas (nitrogen) to 120° C. Then, with stirring, three different monomers containing appropriate per-compound catalysts are dropped in through two separate drop funnels.

Through a first drop funnel is added dropwise a mixture consisting of 60 grams of ethylhexylacrylate containing 1.2 grams of tertiary-butylperbenzoate, and through a second drop funnel is added dropwise a mixture consisting of 20 grams of hydroxypropylmethacrylate, 33 grams of N-methylolacrylamide (60% in water) and 0.8 grams of tertiary-butylperbenzoate. The additions are done during 2 hours. Subsequently, an additional three hours of heating at 120° C. takes place while stirring and removal of water by means of a water separator.

The copolymerizate obtained has a solids content of 74%, a viscosity (50% in ethylene glycol ethyl ether) of 1050 mm$^2$/s and an amine number of 122.

A 10% aqueous solution of the resin neutralized by means of acetic acid to 25% of the amine number has a pH of 6.2. A film cathodically deposited from a solution of the resin on a steel sheet hardens after heating in a circulating air oven at 180° C. after 20 min. and is more difficult to dissolve off by means of organic solvents than the coatings in Examples II-1 to II-4.

EXAMPLE III

Production of Different Pre-Condensates With Phenolic Resins and Amine Resins

III-1

674 grams of 74% copolymerizate II-1 together with 400 grams of a heat reactive phenolic resin (Methylon 75108, a commercial product of General electric; it is a product in which phenolic OH groups are etherified with allylalcohol to form phenolic resins) is pre-condensed under inert gas (nitrogen) for two hours at 120° C. and adjusted with ethylene glycol ethyl ether to a solids content of about 75%. The viscosity of the resin solution amounts to 1450 mm$^2$/s and the amine number of the resin solids is about 70.

The pre-condensate is neutralized to 25% of its amine number by means of 10% acetic acid and diluted with water to a 10% solids content. The pH of the solution is 6.3.

A film of the resin cathodically deposited from aqueous solution on a steel sheet is hardened completely within 20 min. at 180° C. The heat hardened coating is smooth and hard and is only very slowly attacked by organic solvents.

III-2

674 grams of a 74% copolymerizate II-3 is reacted with Methylon 75108 as described in III-1. The viscosity of an ethylene glycol ethyl ether solution having a 75% solids content of the product is 1650 mm$^2$/s and the amine number of the solid resin is about 74.

A 10% aqueous solution of the pre-condensate resin neutralized with acetic acid (pH 6.1) is deposited as a film on a steel sheet connected as cathode. After heating at 180° C. for 20 minutes the film characteristics are similar to those of the films described in III-1.

III-3

1000 grams of the copolymerizate II-4 is precondensed at 120° C. for two hours with 250 grams of a 70% reactive melamine resin (Maprenal VMF 52/7 of Hoechst AG). The resulting 74% resin solution has a viscosity of 1050 mm$^2$/s. As described under III-1 and III-2, the pre-condensate is neutralized with 10 grams of acetic acid (10%) and diluted with water to a solids content of 10% (pH 5.8).

The films of this resin that have been deposited cathodically on a steel sheet harden at temperatures from 160° C. to 180° C. and produce very solvent resistant films.

EXAMPLE IV

Pigmented Paints

IV-1.1 Pigment paste/black 100 grams of the 74% copolymerizate II-1 which has been neutralized by lactic acid to 80% of the amine number is diluted with distilled water to a solids content of 20%. The solution is pre-dispersed in a high-speed stirrer with 370 grams of a black pigment filler material mixture and further dispersed in a fine mill. The aqueous pigment paste with a solids content of 60% has a pH of 5.6.

IV-1.2 Black electrocoating paint-primer 280 grams of the pigment paste IV-1.1 is mixed in a high-speed stirrer with 655 grams of the pre-condensate resin III-1/75% for 20 minutes at about 40° C. Subsequently it is neutralized with 65 grams of 10% aqueous acetic acid and diluted with distilled water to a paint solids content of 16%.

The paint, stabilized in an electrocoating cell under intense stirring, has a pH of 6.3.

A zinc phosphatized steel plate (Bonder 130 of the Metallgesellschaft, Frankfurt) connected as cathode is coated at 25° C. under a direct electric current of 300 V for 120 seconds. The coatings are rinsed with distilled water and subsequently heated in a circulating oven for 20 minutes at 180° C. In this way, 20 μm thick coatings are obtained which are smooth, well hardened and which provide excellent corrosion resistance.

COMPARISON EXAMPLE 1

The pigment paste IV-1.1 is mixed with a binder according to German OS No. 25 41 801, Example C 3, corresponding to a pigment/binder ratio of 0.27:1, only neutralized very little with acetic acid and finally diluted with distilled water to a 16% paint solids content (pH 7.6).

Zinc-phosphatized steel plates (Bonder 130) cathodically coated with the resin and heated for 20 minutes in a circulating air oven at 180° C. The 18 μm thick primer coatings are sprayed over with a conventional light-gray auto-filler based on an alkyd-melamine resin. After being heated in the circulating air oven at 165° C. after 17 minutes the fillers have a dried film thickness of about 35 μm.

One of two such painted sheets is further sprayed with a white auto coating-paint (finish), also based on an alkyd-melamine resin and heated for 17 minutes at 130° C. The dried film thickness amounts to about 35 μm. Both sheets show in the Ford gravelometer test (FLPM-EU-BI 7-1) an unsatisfactory adhesion to the sheet metal base.

EXAMPLE IN ACCORDANCE WITH THE INVENTION

Two zinc-phosphatized metal sheets are coated with the black primer of IV-1.2 provided by the invention as described above, and painted over in a two or three coating procedure. Both sheets show, in the Ford gravelometer test, excellent adhesion properties for the paint applied to the sheet.

COMPARISON EXAMPLE 2

A binder-paint system produced according to Example 5 of the German OX No. 22 52 536 is diluted with distilled water to a paint-solids content of 16% (pH 6.0).

By means of an electrocoating cell, steel sheet is cathodically coated with the resin and then desolvated in a circulating air oven for one hour at 105° C. and weighed. The coatings are subsequently hardened for 20 minutes at 180° C. in a circulating air oven. The film coatings have a thickness of about 15 μm. This constitutes a weight loss of about 18 to 20% based on the coatings after desolvation.

EXAMPLE ACCORDING TO THE INVENTION

Steel sheets coated with the black electrocoating paint IV-1.2 are desolvated in a circulating air oven for one hour at 105° C. and weighed. Subsequent heating in the circulating air oven for 20 minutes at 180° C. hardens the coatings to a film thickness of about 18 to 20 μm. This constitutes a weight loss of about 10 to 11% based on the coatings after desolvation.

EXAMPLE IV-2

White Monolayer-Electrocoating Paint

IV-2.1 White pigment paste 100 grams of the 74% copolymerizate resin of the Example II-4, neutralized with lactic acid to 80% of the amine number, is diluted with distilled water to a solids content of 20%.

The solution is mixed with 370 grams of a titanium dioxide pigment of the rutile type in a high-speed stirrer and subsequently dispersed in a fine mill. The aqueous pigment paste has a solids content of 60% at pH 5.5.

IV-2.2 White electrocoating paint 72 grams of a 60% pigment paste IV-2.1 is stirred in a high-speed stirrer at 40° C. for 20 minutes with 120 grams of a 74% pre-condensate resin III-3. Subsequently, it is neutralized with 8 grams of 10% acetic acid and then the paint is adjusted to a solids content of 15% by means of distilled water. The pH of this paint is 6.0.

Coatings of the paint are cathodically deposited on steel sheets at 240 to 270 V with a 25° C. paint temperature within 120 minutes. The coatings, after heating for 20 minutes at 180° C. in the circulating air oven, yield satisfactory glossy white films having a dried thickness of about 25 μm and which are hard and very resistant to solvents.

What is claimed is:

1. A method of producing water dilutable, cathodically depositable and thermosetting nitrogen-containing basic binders containing tertiary amino groups which comprises reacting a compound having at least one secondary amino group with a compound containing one epoxy group and one copolymerizable olefinic double bond and then copolymerizing the resulting product with at least one polymerizable monomer having an ethylenic double bond.

2. A method according to claim 1 in which the compound containing at least one secondary amino group is a product formed by reacting a compound having one or more epoxy groups with a saturated primary amine.

3. A method according to claim 2 in which the epoxy group-containing compound reacted with the primary amine is a phenolic compound having a glycidylether group.

4. A method according to claim 2 in which the epoxy group-containing compound reacted with the primary amine is an aliphatic or cycloaliphatic compound having a glycidylether group.

5. A method according to claim 4 in which a phenolic compound having a glycidylether group is included in the reaction.

6. A method according to claim 2 in which the compound with one or more epoxy groups is a glycidyl urethane.

7. A method according to claim 6 in which a phenolic compound having a glycidylether group is included in the reaction.

8. A method according to claim 6 in which an aliphatic or cycloaliphatic compound having a glycidylether group is included in the reaction.

9. A method according to claim 2 in which the compound having one or more epoxy groups is a glycidyl carbonate.

10. A method according to claim 9 in which one or more of the following compounds is included in the reaction: (1) a phenolic compound having a glycidylether group; (2) an aliphatic or cycloaliphatic compound having a glycidylether group; and (3) a glycidyl urethane.

11. A method according to claim 2 in which the saturated primary amine is a primary amine containing also a tertiary amino group.

12. A method according to claim 1 or 2 in which the compound containing the epoxy group and the olefinic double bond is allylglycidylether.

13. A method according to claim 1 or 2 in which the polymerizable monomer having an ethylenic double bond is a compound having the formula

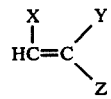

in which
X represents hydrogen, a lower alkyl, a di-lower alkylamino group, phenyl or a lower alkyl substituted phenyl group;
Y represents hydrogen, nitrile, —COOR wherein R is lower alkyl, a $C_2$ to $C_6$ hydroxyalkyl, a $C_2$ to $C_4$ hydroxyalkyl lower dialkylamino,

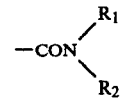

wherein $R_1$ is hydrogen, a $C_1$ to $C_4$ alkyl, —CH$_2$OH or —CH$_2$OR$_3$ wherein $R_3$ is lower alkyl, $R_2$ is hydrogen, a $C_1$ to $C_4$ alkyl or an N,N-dialkylaminoalkyl group in which each alkyl is a $C_1$ to $C_6$ alkyl, and
Z represents hydrogen or a lower alkyl, but
X, Y and Z are not each hydrogen at the same time.

14. A method according to claim 13 in which the polymerizable monomer having an ethylenic double bond is an acrylic or methacrylic acid alkyl ester, hydroxyalkyl ester, aminoalkyl ester or an amide or substituted amide derivative of said acids.

15. A binder produced by the process of claim 1 or 2 having an amine number of about 40 to 400 and a water dilution capability in the range of pH 5 to 8 after partial neutralization with acid.

16. A method according to claim 1 or 2 in which the compound containing the epoxy group and the olefinic double bond is a phenolic compound having a glycidylether group.

17. A method according to claim 1 or 2 in which the compound containing the epoxy group and the olefinic double bond has a glycidylether group.

18. A method according to claim 1 or 2 in which the compound containing the epoxy group and the olefinic double bond is a vinylglycidylether, an allylester of epoxidized alkenyl carboxylic acid, an allylester of epoxidized monocycloalkenyl carboxylic acid, an allylester of epoxidized dicycloalkenyl carboxylic acid, or an allylglycidylcarbonate.

* * * * *

UNITED STATES PATENT AND TRADEMARK OFFICE
CERTIFICATE OF CORRECTION

PATENT NO. : 4,376,848
DATED : March 15, 1983
INVENTOR(S) : ARTY R. T. SUBRAMANYAM ET AL It is certified that error appears in the above-identified patent and that said Letters Patent are hereby corrected as shown below:

On the title page,
  change the German priority application serial number from "3014890" to --3014290--.

Signed and Sealed this

Ninth Day of August 1983

[SEAL]

Attest:

Attesting Officer

GERALD J. MOSSINGHOFF

Commissioner of Patents and Trademarks